Oct. 18, 1932.  F. O. ALBERTSON  1,882,689
VALVE SEAT BORING TOOL
Filed Feb. 18, 1929   3 Sheets-Sheet 3
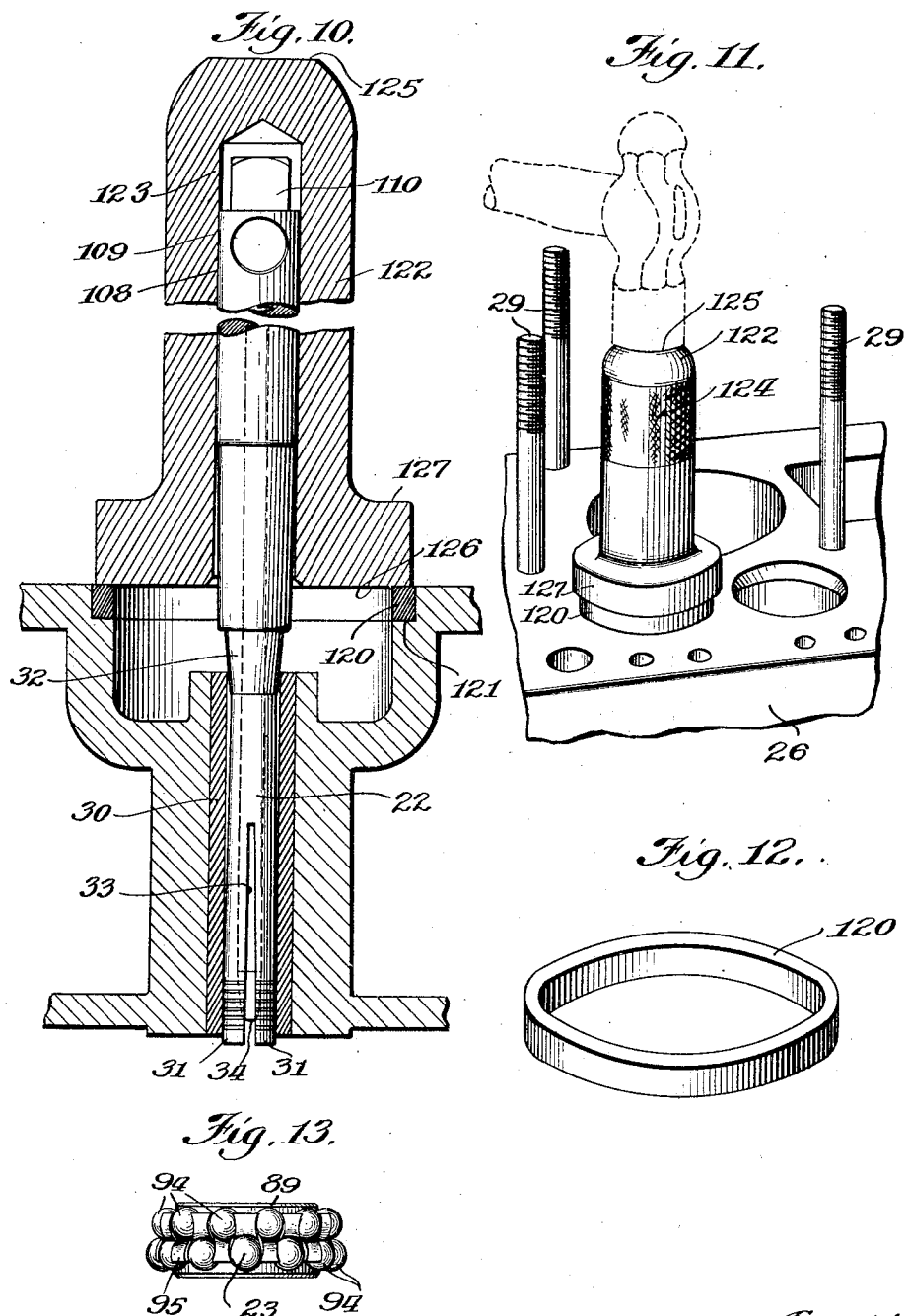
Inventor
Frans O. Albertson
By Williams Bradbury McCaleb & Hinkle
Attys.

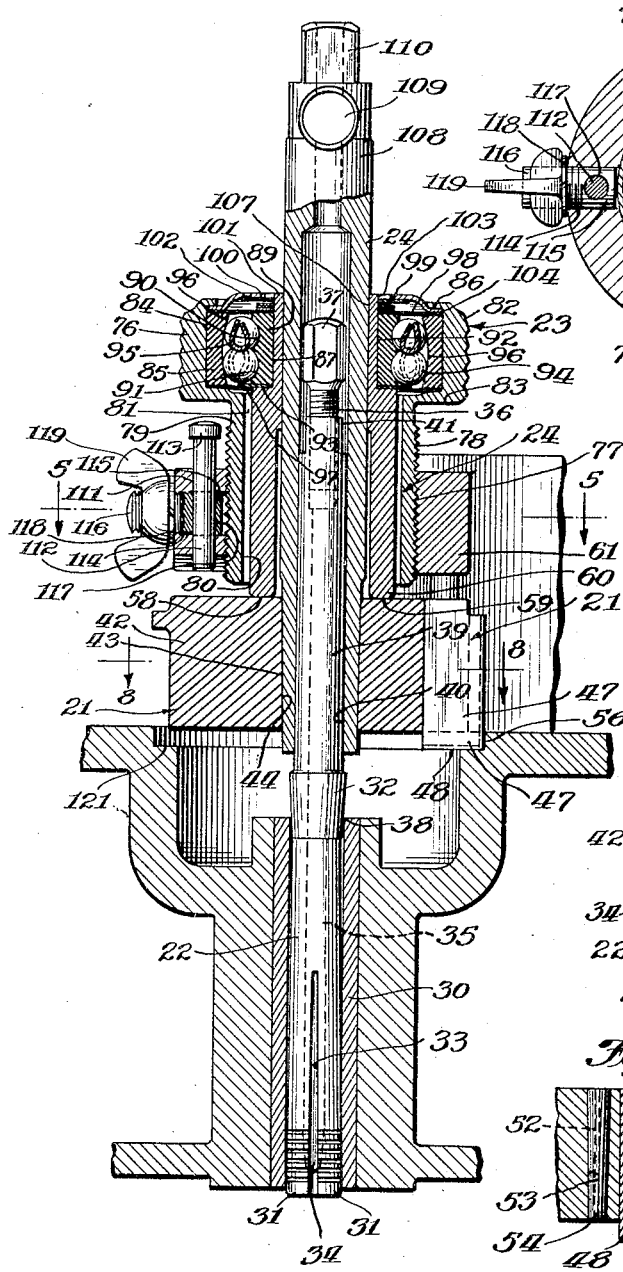

Patented Oct. 18, 1932

1,882,689

UNITED STATES PATENT OFFICE

FRANS O. ALBERTSON, OF SIOUX CITY, IOWA, ASSIGNOR TO ALBERTSON & COMPANY, INC., OF SIOUX CITY, IOWA, A CORPORATION OF IOWA

VALVE SEAT BORING TOOL

Application filed February 18, 1929. Serial No. 340,770.

The present invention relates to valve seat reconstruction tools, and is particularly concerned with tools for refacing or reconstructing valves of internal combustion engines.

The tools of the present invention may be used both for refacing the valve seat by means of reamers or other surfacing tools, or they may be employed for cutting a recess adapted to receive a new metal ring forming a new valve seat.

One of the objects of the invention is the provision of an improved method of reconstruction of valve seats.

Another object is the provision of improved valve seat reconstruction tools, whereby a valve seat may be refaced or reconstructed with its axis in accurate alignment with the axis of a valve guide.

Another object is the provision of an improved method of valve seat reconstruction, in which the alignment and support of the cutting members is accomplished principally by a pilot stem which is accurately and fixedly secured in a valve seat guide.

Another object is the provision of an improved valve seat reconstruction tool which is adapted to reinforce and support a pilot stem in an aligned position, while depending upon said pilot stem to perform the function of alignment.

Another object of the invention is the provision of tools of the class described which are more simple, economical and more sturdy than the tools of the prior art.

Another object is the provision of an assembly of valve seat reconstruction tools, which is capable of performing heavy cutting operations without the tool binding in its bearings, and which is capable of operation with a minimum of effort.

Another object is the provision of a tool of the class described having an improved feed gauge and feed mechanism capable of feeding the cutter without changing its alignment.

Another object is the provision of a novel ring installation tool and a novel method of installation of valve seat rings.

Other objects and advantages of the invention will be apparent from the description and from the accompanying drawings in which similar characters of reference indicate similar parts throughout the several views.

Referring to the drawings, of which there are three sheets:

Fig. 4 is a sectional view through the tool and engine block taken in Fig. 1 on the plane of the line corresponding to the line 4—4 of Fig. 2;

Fig. 5 is a sectional view taken on the plane of the line 5—5 of Fig. 4;

Fig. 6 is a plan view of a spring washer used in the universal bearing;

Fig. 7 is a sectional view taken on the plane of the line 7—7 of Fig. 6;

Fig. 8 is a sectional view taken on the plane of the line 8—8 of Fig. 4;

Fig. 9 is a sectional view taken on the plane of the line 9—9 of Fig. 8;

Fig. 10 is a view similar to Fig. 4 showing the assembly of tools used in installing a valve seat ring;

Fig. 11 is a view in perspective of the driving tool;

Fig. 12 is a view in perspective of a valve seat ring;

Fig. 13 is an elevational view of the antifriction bearing with the outer race removed, showing the ball bearing ring.

Figure 1:
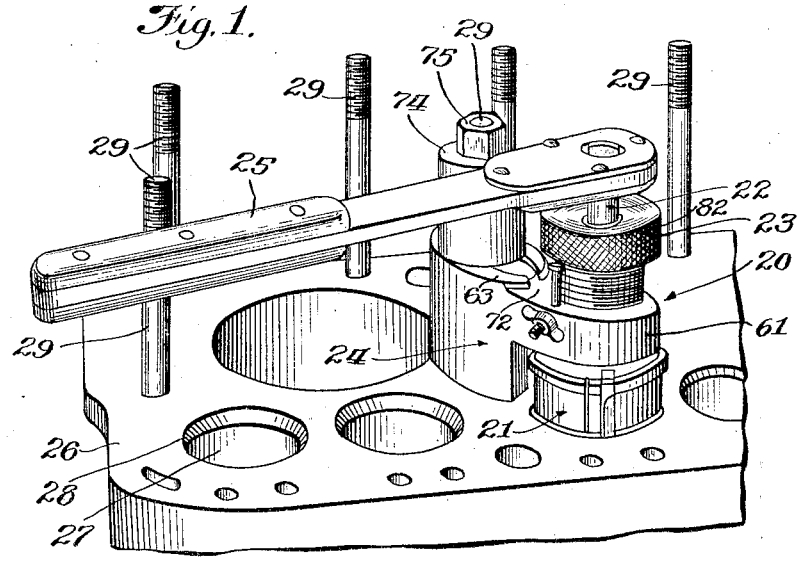
Fig. 1 is a view in perspective of the valve seat reconstruction tool applied to the block of an internal combustion engine.

In the embodiment chosen to illustrate the invention (referring to Figs. 1, 2 and 4), 20 indicates the valve seat reconstruction tool assembly in its entirety. The tool preferably includes a cutter 21, a pilot stem 22, a bearing 23, a tool holder 24, and means for actuating the cutter which may consist of a ratchet lever 25, or other actuating devices.

The ratchet lever 25 may be of any conventional type, and as any type of actuating device may be used, the ratchet lever will not be described in detail.

Many of the advantages of the invention may be realized without employing all of the elements shown in the complete assembly, and it should be understood that the invention includes the use of the various sub-combinations and permutations of all of the elements described, wherever such combinations will be advantageous, and the scope of the invention is to be limited only by the terms of the appended claims.

Referring to Fig. 1, the conventional internal combustion engine block 26 is provided with a plurality of valve openings 27, having valve seats 28 formed therein, and with a plurality of stud bolts 29 for securing the motor head to the block. The valve seat tool assembly 20 is illustrated in the operation of reconstructing a valve seat 28 by cutting a recess adapted to receive a metal member forming a new valve seat.

The valve seat tool is preferably provided with a pilot stem 22 of the type illustrated in the prior patent of Frans O. Albertson, No. 1,806,189 dated May 19, 1931, which is peculiarly adapted to accurately center itself axially of any valve stem guide such as the guide 30, and adapted to be fixedly mounted in the valve guide 30 by expanding the parts 31 of a tripartite end.

The pilot stem 22 is provided with a frusto-conical portion 32 spaced from the end 31 and adapted to engage the inner and upper edge of the cylindrical valve guide 30, automatically centering the pilot stem at this point. The lower end of the pilot stem 22 is split three ways as at 33, forming three split portions 31 of equal thickness and adapted to be cammed apart by a caming member 34, which extends longitudinally of the pilot stem in the bore 35. The camming member 34 is provided with threads 36 adjacent its upper end adapted to be received in complementary threads carried by the bore 35 and the camming member is provided with a non-circular head 37.

The functions of such a pilot stem are fully set forth in the application above mentioned, so that it will suffice to say that since three points determine the location of a circle, the tripartite end is peculiarly adapted to accurately center the lower end of the pilot stem 22 axially of the valve guide 30 in a manner which cannot be accomplished by any pilot stem not constructed according to the present invention. As the pilot stem is already centered at the point 38 of the valve guide 30 by the cone 32, it will be observed that the pilot stem is accurately located with its axis coinciding with the axis of the valve guide 30, and the pilot stem is thus adapted to accurately support a cutter 21, or other resurfacing tool, so that it may form a valve seat having its axis accurately located in the axis of the valve guide.

The pilot stem 22 is also peculiarly adapted to have the camming member 34 placed in a state of compression with the pilot stem 22 in a state of tension, so that the pilot stem becomes extremely stiff when located within a valve guide 30, as shown in Fig. 4.

It will thus be observed that the pilot stem of the present invention is peculiarly adapted to be accurately centered and fixedly secured axially within a valve guide 30, so that the pilot stem may guide a cutter or surfacing tool for accurately forming or resurfacing a valve seat 28. As the valve seats 28 are surfaces of revolution, it is of the utmost importance that the seats be formed with their axes accurately located in the axis of the valve stem guide, so that the valves will seat equally at every point upon the seat.

It should be noted that in the present invention the pilot stem 22 is adapted to perform the function of alignment, support and guidance of the cutter 21 upon the tool holder 24, as distinguished from devices in which the pilot stem is merely employed for determining the approximate axial position of the cutter, and it should also be noted that the present method of operation is capable of mathematical accuracy as distinguished from the methods in which a pilot stem is loosely rotated until it assumes the most free position. The latter method merely locates a pilot stem in the approximate axial position, and the accuracy of the latter method depends upon the play between the pilot stem and a worn valve guide.

Above the cone 32 the pilot stem 22 is provided with an elongated cylindrical portion 39, which is accurately machined to fit within an elongated and accurately cylindrical bore 40 in the tool holder 24. By means of the complementary elongated cylindrical surfaces 39 and 40, the tool holder 24 is accurately located axially of the valve guide 30 and supported for rotation and reciprocation upon the pilot stem 22.

At its upper end the pilot stem 22 may be provided with flattened portions 41 for engagement with a wrench in manipulation of the pilot stem, and the bore 40 is of sufficient length so that it is adapted to receive the pilot stem and the head 37 of the camming member in any position to which the tool holder may be fed when used on modern internal combustion engines.

The cutter 21, which has been chosen to illustrate one embodiment of the invention, is of the type employed for cutting a recess in an engine block for the insertion of a new valve seat, and the cutter may comprise a substantially cylindrical metal body 42 made of tempered tool steel and provided with a centrally located frusto-conical aperture 43, which is tapered to form a close frictional fit with the tapered or frusto-conical portion 44 of the tool holder 24.

At one side, the cutter 21 may be provided with an axially extending slot 45 of substantially rectangular cross-section extending inward toward the center of the cutter from its outer cylindrical surface. The slot 45 is preferably so located that the wall 46 of the slot extends radially of the cutter 21, so that the edge of the blade 47 will be located substantially radially of the cutter body 42. The blade 47 comprises a tempered tool steel member of substantially rectangular cross-section, which is adapted to fit within the slot 45. At its lower end, the blade 47 is provided with a forward cutting edge 48 on the clockwise side of the cutter below the wall 46 of slot 45, and the blade 47 is beveled upward and backward at 49 in a counterclockwise direction to permit the cutting edge 48 to come into better cutting relation with the work. In order to definitely locate the blade 47 in its slot 45, the cutter may be provided with a backwardly extending heel 50, forming a shoulder 51 which engages the lower flat surface of the cutter body 42.

The cutter body 42 may be provided with a second slot 52, comprising a saw cut located substantially parallel to the slot 45 and slightly spaced therefrom. The slot 52 is also provided with a bore 53, into which a tapered pin 54 may be driven, spreading the slot 52 and forcing the intermediate portion 55 of the body 42 into engagement with blade 47 to permanently retain the blade in the cutter body.

The blade 47 is also provided with a cutting edge at 56 extending axially of the cutter body, and the blade is beveled backward from the cutting edge 56 as at 57. The cutter body 42 is provided with an upper flat surface 58 which is adapted to be engaged by the lower surface 59 of a bearing member 60 for forcing the cutter into engagement with the work.

In order to provide means for forcibly feeding a cutter or surfacing tool against the work or valve seat, the complete tool assembly preferably includes a body member 61, which is adapted to be secured to the engine block 26, preferably by means of the stud bolts 29, with which the engine block 26 is already provided. The supporting body member 61 is also incidentally adapted to provide auxiliary support for the upper end of the pilot stem 22 and tool holder 24 without, however, changing the alignment of the cutter 21, and without preventing the pilot stem 22 from performing the function of aligning the cutter.

The body member 61 is thus provided with a bearing 23 adapted to rotatably support the tool holder 24 adjacent its upper end so that the lateral forces which are brought to bear upon the upper end of the tool holder 24 are resisted by the bearing 23 of body member 61.

The body member 61 is preferably arcuate in shape, having an elongated curved body portion 62 provided with a curved slot 63 adapted to receive the stud bolts 29 in any one of a plurality of different positions. The body portion 62 is thus provided with a pair of spaced curved walls 64 and 65, defining the slot 63 and joined at each end by the end portions 66 and 67. The lower surfaces 68 of the body portion 62 are preferably machined to a substantially plane surface, which is adapted to flatly engage the upper flat surface of the engine block 26.

The body portion 62 may also be provided with a pair of undercut slots 69 extending along the inner and upper edges of the walls 64 and 65 and adapted to receive the complementary dovetail formation 70 upon a washer 71. The body member 61 is widened beyond the end portion 67 to form a bearing portion 72, and the walls 64 and 65 may project slightly above the bearing portion 72 so that the bottoms of the undercut slots 69 terminate flush with the upper surface of bearing portion 72.

Figure 2:
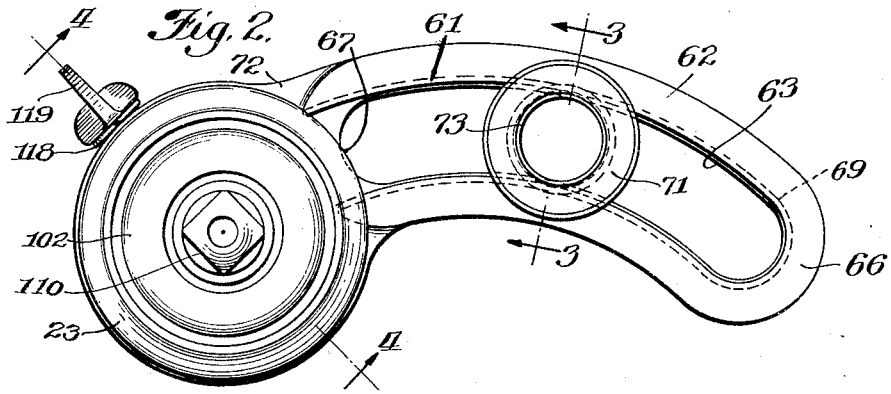
Fig. 2 is a plan view of the tool with the ratchet lever removed.
Figure 3:
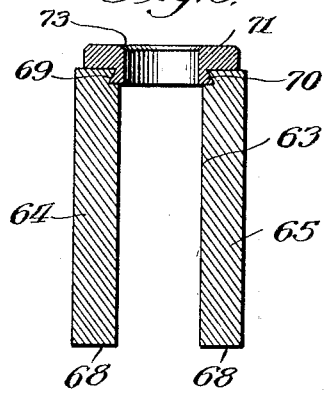
Fig. 3 is a sectional view taken on the plane of the line 3—3 of Fig. 2.

The washer 71 may thus be removed by sliding it out of undercut slots 69 at the left end of Fig. 2, when the bearing is removed from the body. The washer 71 is thus slidably supported upon the body 61 of the tool, so that the tool may be located in any of a plurality of positions with a stud bolt passing through slot 63 of the body and bore 73 of the washer.

If the stud bolts are longer than the height of the walls 64, 65 a substantially cylindrical spacing member 74 may be placed upon the bolt and the body secured in place by a nut 75. The curved body 61 enables the tool to be secured with ordinary stud bolts in positions where it would otherwise be impossible to secure the body on account of the interference with other stud bolts, and the curvature of the body combined with the plane surfaces 68 at its base gives the tool a greater stability and fixity when secured to the engine block by a single bolt 29.

In order to forcibly cause the cutter 21 to progress into the work, the tool is preferably provided with a feeding member 76 for supporting the bearing 23, and the bearing portion 72 of the body is provided with a vertically extending bore 77 internally threaded to receive the externally threaded portion 78 of the feeding member 76. The feeding member 76 comprises an annular metal member having a substantially cylindrical portion 79 provided with relatively fine external threads 78 and having an axially and centrally located bore 80 of substantially larger size than the size of the bearing member 60, providing considerable play at 81 between these members.

At its upper end, the feeding member 76 is substantially increased in diameter, having an enlarged cylindrical surface 82, which is knurled to facilitate a better grip with the hand of the operator or with tools, and forming an annular shoulder 83 for use in gauging the depth to which a recess is to be cut in an engine block.

The enlarged portion 82 of the feeding member 76 is provided with a counter-bore 84 adapted to receive the outer raceway 85 of a bearing 23, and the upper edge of the feeding member 76 is made relatively thin as at 86, so that the edge 86 may be turned over, as shown in Fig. 4, to retain the parts of the bearing 23 in an assembled relation.

The inner bearing member 60 comprises a substantially cylindrical member, substantially smaller than the bore 80 of the feeding member, leaving sufficient clearance for a limited universal movement between the feeding member 76, and the inner bearing member 60 is provided with a reduced cylindrical portion 87, forming an annular shoulder 88 for definitely limiting the position of the inner race member 89. The inner race member 89 comprises an annular tempered steel member having a pair of circular grooves 90 and 91 formed in its outer surface and having a centrally located bore 92 adapted to receive the reduced portion 87 of the inner bearing member with a forced frictional fit.

A sheet metal washer 93 may be confined between the inner race 89 and the shoulder 88 for closing the upper end of the annular space or clearance 81. The ball bearngs 94 are assembled in the grooves 90 and 91, and supported in staggered relation to each other by a ball ring 95, and the outer race 85 is provided with a single concave groove 96 of circular cross-section, which is adapted to permit a universal movement between the outer race 85 and the inner race 89, the ball bearings 94 moving with the inner race 89. The groove 96 has a substantially spherical surface formed at a radius equal to the distance from the center of the bearing to the surface of groove 96.

The counter-bore 84 may be provided with a flexible fabric washer 97, after which the inner bearing member 60, inner race 89, balls 94 and outer race 85 may be placed in counter-bore 84. A second flexible fabric washer 98 may be placed above the bearing, after which a plurality of spring washers 99 may be placed about the reduced portion 87. A sheet metal washer 100 may then be placed above the spring washers 99 and secured in place by riveting over the upper end 101 of the reduced portion 87. The bearing assembly may be retained within the feed member 76 by a dished sheet metal member 102, having an enlarged bore 103, and having its outer edge 104 secured between the race 85 and the turned over edge 86 of the feed member 76. The dished portion of the dished member 102 is adapted to provide space for the spring washers 99, and it should also be noted that the metal washer 100 is of smaller size than the dished portion of the member 102, so as to permit the washer 100 to slide about in the dished member 102 when pivotal or universal movement takes place between the feeding member 76 and the inner bearing member 60.

The spring washers 99 are illustrated in detail in Figs. 6 and 7, and they may comprise tempered sheet metal members of annular shape which are provided with the diametrically opposite flat portions 105 bent up out of the plane of the flat portions 106 of the spring washer 102.

The inner bearing member 60 is provided with an accurately machined, centrally and axially located bore 107, adapted to slidably and rotatably receive the cylindrical outer surface 108 of the tool holder 24. The upper end of the tool holder 24 may be provided with a transverse bore 109 for receiving hand levers or rods used in oscillating the tool holder 24 and with a non-circular end or head 110 adapted to receive the ratchet lever 25.

It will thus be observed that the bearing member 23 is adapted to rotatably support the tool holder 24 and cutter 21 upon an axis which is determined by the position of the pilot stem 22, and the inner bearing member 60 is adapted to pivot universally to permit the tool holder 24 to assume the position determined by the pilot stem. The universal movement of the bearing member 60 also permits its lower edge 59 to engage flatly on the upper surface 58 of the cutter body 42 to force the cutter into engagement with the work.

The bearing 23 constitutes an anti-friction thrust bearing which is adapted to permit limited universal movement, so that the feeding member 76 will provide a substantially axial feeding force upon the cutter 21 at all times. The cutter may be fed into the valve seat by rotating the feeding member in a clockwise direction in Fig. 1, causing the inner bearing member 60 to progress axially of the pilot stem 22. When the feeding member 76 is thus actuated, and the cutter 21 is employed for resurfacing or cutting a recess, the force which is brought to bear upon the cutter 21 may be increased as desired although the amount of friction which would be present in an ordinary bearing would be such as to require a large proportion of the effort for merely overcoming the friction of the bearing as distinguished from a cutting operation. With the present construction, however, the cutter 21 may be fed quite rapidly into the engine block and the cut accomplished with ease; thereby, greatly decreasing the amount of time and labor consumed in reconstructing a valve.

Furthermore, it should be observed that the universal anti-friction bearing is peculiarly adapted to permit the pilot stem to perform the aligning function conforming to the position of the valve guide, and incidentally the bearing 23 is adapted to resist lateral forces applied to the head 110 of tool holder 24 by ratchet lever 25, which forces might otherwise tend to bend a relatively slender pilot stem.

The bearing portion 72 of the body member 61 is preferably provided with a bore 111 extending substantially parallel to the bore 77 and adapted to slidably receive a pin 112 having a head 113. The bearing portion 72 is also provided with a threaded bore 114 extending transversely to the bore 111 and communicating therewith, and the bore 114 is adapted to slidably receive the cylindrical end 115 of the threaded bolt 116. The bolt 116 is provided with a transverse bore 117 adapted to register with the bore 111 and adapted to receive pin 112, and a spring washer 118 and a wing nut 119 are provided, securing the bolt 116.

When the parts are in the position of Fig. 4, and the wing nut 119 is threaded in a clockwise direction on bolt 116, the bolt 116 is drawn out of its bore 114, clamping against the pin 112, and securing the pin 112 in any adjusted position. The pin 112 with its securing means comprises an adjustable gauge for determining the amount of feed required to make a predetermined depth of cut.

The pilot stem 22 is also adapted to be used with the assembly of parts shown in Fig. 10 for inserting a new valve seat ring 120 in the recess 121 formed by the cutting tool 21. The ring 120 comprises an annular metal member which may be constructed of tempered steel or any other material desirable for a valve seat. The body of the ring 120 is preferably of substantially rectangular cross-section and adapted to be secured by close frictional fit within the complementary annular recess 121, made by cutting tool 21.

The ring 120 is preferably installed by using a driving tool 122 and comprising a substantially cylindrical metal member having an accurately machined, axially extending and centrally located bore 123, adapted to slidably receive the cylindrical portion 108 of the tool holder 24.

The body of the driving member 122 forms a handle which may be knurled as at 124 for convenient manipulation, and the upper end of the driving tool forms an impact surface 125 to be engaged by a hammer or other driving tool. The lower surface 126 of the driving tool is substantially flat and may be enlarged, if necessary, to correspond to the diameter of the ring 120, forming an annular flange 127, adapted to extend over and to engage above the top of the ring 120.

The method of use of the driving tool 122 will be explained in detail hereinafter, but it should be noted that the pilot stem 22 is highly advantageous for guiding the driving member 122 in driving a ring 120 into a close frictional fit in the recess 121. The pilot stem is adapted to support the driving tool axially of the recess 121, so that the ring is forced in at all sides of the recess simultaneously, without trouble or without damaging the ring, an operation which is rendered much more difficult without the use of the pilot stem. When an effort is made to insert a ring without the use of the pilot stem, the tendency is to drive the ring in at an angle so that the walls of the recess may be damaged, or the ring seated at a tilt, or the ring may be so damaged that it will not properly seat in the recess thereafter.

The present valve seat tool may be employed with roughing reamers or other surfacing tools for accurately resurfacing valve seats and the operation of resurfacing a valve seat is greatly simplified and the labor lessened by the use of the present tool. The feeding device is adapted to permit a heavy force to be brought to bear upon the roughing reamer, so that the operation may be done in a small portion of the time otherwise necessary, and the universal bearing provided is adapted to permit the feeding operation without disturbing the alignment determined by the pilot stem fixed in the valve guide.

It will thus be observed that the present device is adapted to effect a rapid and accurate resurfacing of valves with a minimum of effort.

The device may also be employed for entirely removing the metal surface of an old valve seat, forming a recess adapted to receive a new metal ring for forming a new valve seat.

The mode of operation of the valve seat tool is as follows: The pilot stem 22 may be inserted in the valve guide 30 and given a slight tap with a hammer to seat the cone 32 in the guide 30 and center the pilot stem at cone 32. A wrench or other tool may then be applied to the head 37 of the camming member and by turning in a clockwise direction, the camming member will force the tripartite end 31 apart, engaging the valve guide 30 and accurately centering the lower end of the pilot stem. The pilot stem 22 is then located axially and centrally of the valve guide 30, as distinguished from devices in which the pilot stem is loosely received in the valve guide.

The camming member 34 may be threaded into the pilot stem 22 beyond the point necessary to cause the lower end of the pilot stem to engage, thereafter placing compression upon the camming member 34 and placing the pilot stem 22 in tension, and greatly stiffening these members.

The tool holder 24 and cutter 21 may then be placed upon the pilot stem 22, the tool holder being slidably and rotatably received on the pilot stem. Since the pilot stem is located with its axis in the axis of the valve guide 30, any surface or recess formed by the cutter 21 will have its axis accurately located in the axis of the valve guide 30, and the valve can be seated upon such a surface with equal sealing effect at all points.

The supporting body 61 may then be placed over an adjacent stud bolt 29 with the tool holder 24 in the inner bearing member 60, and the position of the body 61 on the engine block will be determined by the position of the pilot stem 22. The body 61 is then secured to the engine block 26 by the nut 75, with or without a spacing member 74, as required by the particular length of stud bolt, and the bearing 23 will adjust itself axially of the pilot stem 22, since a limited universal movement is permitted between the inner bearing member 60 and body member 61.

The cutter 21 may now be fed downward by rotating the feeding member 76 in a clockwise direction, so that the feeding member progresses downward in the bore 77, carrying with it the bearing 23, including the inner bearing member 60. The inner bearing member 60 is brought into engagement with the top of the cutter body 42, after which the inner bearing member 60 reacts against the ball bearings 94 by means of grooves 90 and 91, and the ball bearings react against groove 96, which permits the inner bearing member to adjust itself universally, but which is adapted to resist axial thrust.

Any desired pressure may be brought to bear upon the cutter 21 by means of the universal ball bearing 23 without causing the bearing to bind, and the cutter may be rotated with ease by applying the ratchet lever 25 or other tool to the non-circular head 110.

It should also be noted that the universal bearing 23 is peculiarly adapted to permit the cutter 21 to be constantly maintained aligned in axial position with valve guide 30 by pilot stem 22, and this constant alignment could not be accomplished by an ordinary bearing. It is practically impossible to cut a feeding member 76 with threads 78 which are located accurately relative to the axis of the feeding member, because the threads are commonly cut with a cutter which feeds and guides itself, and if the metal is softer on one side, the threads will be cut deeper, and where the metal is harder, the threads will be more shallow. Consequently, it will be observed that the alignment of a threaded member may change as the threaded member progresses, but in the present device, the cutter may be maintained in alignment by means of the universal bearing used at the upper end of the tool holder.

If the operation to be performed is merely a resurfacing operation, it is unnecessary to use any gauge, and the resurfacing tool is merely actuated by the ratchet lever 25 until every part of the surface has been refinished.

It should be noted that the new surface cut is a surface of revolution, which has its axis accurately located in the axis of the valve guide 30, since the alignment of the present device does not depend on the use of a loose pilot supported in a position in which it rotates most freely, but the alignment is accomplished by a self-centering pilot, permanently fixed with its axis in the axis of the valve guide 30. The alignment of the cutter axis with the axis of the valve guide may thus be accomplished with mathematical exactitude.

Where the reconstruction tool is employed for inserting a new valve seat ring, the tool is first set up as shown in Fig. 4, with the cutter blade 47 resting upon the upper edge of the engine block 26, the ring 120 which it is proposed to insert is held with its upper surface against the shoulder 83, and the head 113 of the pin 112 is moved up until it engages the bottom of the ring 120, the pin being secured by turning wing nut 119 clockwise.

After this, the cutter may be rotated by means of the ratchet lever 25 while the feeding member 76 is also constantly fed downward by rotating said feeding member clockwise, and the cutting operation proceeds quickly until an annular groove 121 of a shape complementary to the ring 120 is formed in the engine block 26. The feeding movement may progress until shoulder 83 engages head 113 of the gauge member 112, when the depth of groove 121 will correspond to the thickness of ring 120. The cutter 21 has, of course, been constructed with its outer cutting edge 56 so located relative to the axis of cutter 21 that the diameter of the recessed portion of the valve seat is slightly less than the outside diameter of the ring 120, so that the ring 120 may be driven into a close frictional fit with the walls of groove 121.

The entire body 61 of the reconstruction tool with tool holder 24 and cutter 21 may be removed by loosening the nut 75, leaving the pilot stem 22 in accurately aligned position in valve guide 30. A ring may then be placed over the pilot stem 22 above the inner groove 121, but as the ring is larger than the diameter of the recessed portion of the block, the ring will remain above the face of the engine block. The cutter 21 may be removed from tool holder 24 and tool holder 24 replaced upon pilot stem 22.

The driving tool 122 may then be placed with its bore 123 about the cylindrical portion 108 of tool holder 24, and the ring 120 may be located with the fingers, directly above the annular groove 121 and held flatly against the bore surface 126 of driving tool 122. The ring may then be quickly driven into the recess 121 by a few blows of a hammer upon impact surface 125 of driving tool 122, during which time the pilot stem 22 will hold the driving tool 122 axially of the annular groove 121, so that the ring may be driven in axially with a few blows until it seats itself against the bottom of the groove 121.

It should be noted that since the valve seat ring 120 is constructed of relatively hard resilient metal, such as tool steel or an iron alloy having the qualities of heat resistance and uniform hardness, the ring ordinarily tends to spring back out of the annular groove 121 until it has been well started and the operation of driving the ring without the driving tool 122 or pilot stem 22 is a very difficult matter, consuming more time and tending to damage the ring.

If the ring is of greater diameter than the standard driver, an extension driver or adapter, comprising an annular spacing member of greater diameter than the annular portion 127 of the driving tool, may be used. The adapter or extension driver is placed over the pilot stem 22, above the ring and below the driving tool 122.

If the combustion chambers are counterbored, a cutter spacer may be inserted between the upper surface of the cutter and the lower surface of the inner bearing member 60. The spacer 74 is exemplary of each of the spacers herein described, except that the size of the spacer may be varied to fit the parts with which it is to be used.

If the valve seat ring protrudes above the surface of the block the ring may be faced off flush with the block by using the cutter 21, after which the valve seat may be cut in the usual manner with a reamer or surfacing tool.

The driving tool 122 is also adapted to be used to remove the cutters from the tapered portion 44 of tool holder 24 by simply placing the driving tool above the cutter on the tool holder, resting the end of the pilot stem on a block and tapping the cutter free.

It will thus be observed that the valve seat tools of the present invention are peculiarly adapted to be aligned with mathematical accuracy with the cutter axis coinciding with the axis of a valve guide, and the accurate alignment of the tool is accomplished by means of a pilot stem fixedly secured in the valve guide. The separate parts of the machine are, of course, of general application and may be used with any pilot stem, but the most accurate results can only be obtained when the pilot stem actually fits valve guide 30, or when a pilot stem of the type described, capable of accurate, axial centering, is used.

The present method of reconstructing valve seats comprises the following steps when the entire method is employed, although various sub-combinations of the steps may also be used with advantageous results:

A pilot member is first placed in a valve guide and located axially of the valve guide at one point of the length of the pilot member, after which another point in the pilot member is centered in the valve guide by expanding the tripartite end of the valve guide to engage the walls of the guide. The pilot member is now accurately and mathematically centered with its axis in the axis of the guide.

The pilot member may then be placed under the state of tension to stiffen the same and fixedly secure it within the valve guide, after which the cutter with its tool holder may be placed upon the pilot stem, the complementary surfaces of these parts accurately aligning the cutter with its axis in the axis of the valve guide. The cutter is now guided by the pilot stem to perform a cutting operation, which will either cut a recess for a new valve seat ring or resurface a valve seat, and in either case, the surface formed will be a surface of revolution having its axis at the center of the valve guide.

The cutter may also be guided by the auxiliary support provided by bearing 23. Since the bearing 23 is a universal bearing it can only provide an auxiliary support against lateral movement of the tool holder or pilot and a thrust bearing against which the feeding member may react, so that the bearing 23 only assumes a position which is determined and maintained by the pilot member. The cutter may then be fed axially of the pilot stem by means of the supporting body with its feeding member and rotated about the axis of the pilot stem by any convenient source of power to cut a groove or resurface a valve seat.

If a groove has been cut, the next steps in the reconstruction of a valve seat are the placing a ring above the recess, guiding a driving tool by means of a pilot member, and driving the ring into frictional engagement with the walls of said recess to seat the ring in the recess.

The ring may then be cut off flush with the surface of the block, using the same method previously described and the valve seat may be formed by using a cutter of appropriate shape according to the same method.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a valve constructon tool, the combination of a pilot member adapted to be fixedly secured in a valve stem guide in centered position, with a tool holder rotatably and slidably mounted on the upper end of said pilot, a valve seat tool carried by said holder and having a cutting edge for engagement with a valve seat, a reinforcing fixture having a body adapted to be fixedly secured to the engine block, said fixture being formed with a threaded bore adapted to be brought into substantial alignment with the axis of said pilot, a feeding sleeve having an external threaded surface adapted to be received in said bore, a guide sleeve having a cylindrical bore adapted to rotatably and slidably receive the upper end of the tool holder said guide sleeve having its lower end in engagement with the upper surface of said tool and a universal bearing interposed between said feed sleeve and said guide sleeve whereby said tool holder and cutter may rotate freely with respect to said feed sleeve and said tool holder and cutter are free to align themselves with respect to the pilot during the rotation of the cutter.

2. In a valve construction tool, the combination of a pilot member adapted to be fixedly secured in a valve stem guide in centered position, with a tool holder rotatably and slidably mounted on the upper end of said pilot, a valve seat tool carried by said holder and having a cutting edge for engagement with a valve seat, a reinforcing fixture having a body adapted to be fixedly secured to the engine block, said fixture being formed with a threaded bore adapted to be brought into substantial alignment with the axis of said pilot, a feeding sleeve having an external threaded surface adapted to be received in said bore, a guide sleeve having a cylindrical bore adapted to rotatably and slidably receive the upper end of the tool holder said guide sleeve having its lower end in engagement with the upper surface of said tool, a universal bearing interposed between said feed sleeve and said guide sleeve whereby said tool holder and cutter may rotate freely with respect to said feed sleeve and said tool holder and cutter are free to align themselves with respect to the pilot during the rotation of the cutter, said universal bearing comprising an outer race carried by said feed sleeve and formed with a curved annular groove having its center of curvature substantially in the axis of the tool holder, a plurality of anti-friction balls in said race and freely movable transversely with respect to said race on said center of curvature, and a second race carried by said guide sleeve and adapted to engage said balls to retain them in said races.

3. In a valve construction tool, the combination of a pilot member adapted to be fixedly secured in a valve stem guide in centered position, with a tool holder rotatably and slidably mounted on the upper end of said pilot, a valve seat tool carried by said holder and having a cutting edge for engagement with a valve seat, a reinforcing fixture having a body adapted to be fixedly secured to the engine block, said fixture being formed with a threaded bore adapted to be brought into substantial alignment with the axis of said pilot, a feeding sleeve an external threaded surface adapted to be received in said bore, a guide sleeve having a cylindrical body adapted to rotatably and slidably receive the upper end of the tool holder said guide sleeve having its lower end in engagement with the upper surface of said tool, a universal bearing interposed between said feed sleeve and said guide sleeve whereby said tool holder and cutter may rotate freely with respect to said feed sleeve and said tool holder and cutter are free to align themselves with respect to the pilot during the rotation of the cutter, said body being provided with a bore extending parallel to said feed sleeve, a stop pin adjustably mounted in said bore, threaded clamping means for securing said stop pin in predetermined adjusted position and an annular shoulder carried by said feed sleeve and adapted to engage said stop pin to limit the feeding movement of said feed sleeve and determine the depth of cut.

In witness whereof I hereunto subscribe my name this 12th day of February, 1929.

FRANS O. ALBERTSON.